Figure 1:
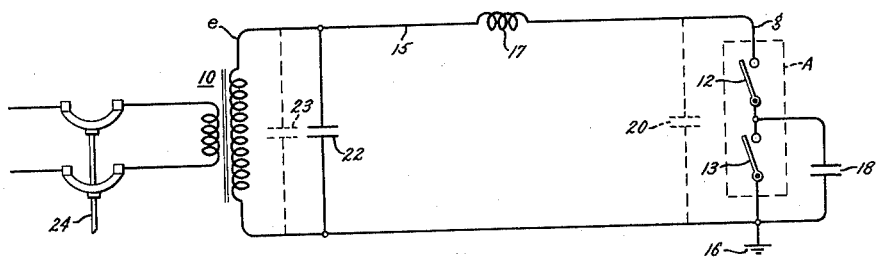

Jan. 7, 1958 W. F. SKEATS 2,819,446
CIRCUIT FOR TESTING HIGH CAPACITY POWER CIRCUIT BREAKERS
Filed Dec. 23, 1955

Inventor:
Wilfred F. Skeats,
by J. Wesley Haubner
His Attorney.

United States Patent Office 2,819,446
Patented Jan. 7, 1958

2,819,446

CIRCUIT FOR TESTING HIGH CAPACITY POWER CIRCUIT BREAKERS

Wilfred F. Skeats, Lansdowne, Pa., assignor to General Electric Company, a corporation of New York Application December 23, 1955, Serial No. 554,984

8 Claims. (Cl. 324—28)

This invention relates to a circuit for testing high-capacity power circuit breakers and, more particularly, high-capacity breakers of the multi-break type.

Many large circuit breakers are required, under actual field conditions, to interrupt power which exceeds that which is available for testing the breaker. To enable such breakers to be tested, it is necessary that a source of relatively low power be utilized to simulate the high power interrupting conditions which will be actually encountered in the field.

Accordingly, it is an object of my invention to provide an improved circuit breaker testing scheme which is capable of efficiently utilizing a source of relatively low power to simulate high power interrupting conditions.

As disclosed hereinafter, this source of relatively low power is capable of supplying a testing current equal to the full current which the breaker, in the field, will be required to interrupt but a testing voltage considerably less than the rated voltage of the breaker, or interrupter. If a multi-break interrupter is directly tested from such a source of reduced voltage, this reduced voltage would distribute itself across the individual breaks in the same general manner as in the field, and, as a result, these individual breaks would be subjected to voltages less than the actual field voltages. To simulate more closely actual field conditions it would be necessary to apply a major portion and, in many cases, the entire testing voltage to each individual break.

Accordingly, another object of my invention is to provide a testing arrangement which is capable of applying substantially the entire testing voltage to each of the individual breaks of the multi-break interrupter being tested.

My invention is particularly suited for the type of test in which it is desired to evaluate the interrupting ability of a particular individual break of a multi-break interrupter taking into account the effects of substantially simultaneous arcing in the other breaks. To enable an accurate evaluation of this capability, it is important, that the particular break which is being tested be subjected to current for a duration of time representative of actual field conditions. To this end it is important that a break other than the one being tested does not prematurely effect circuit interruption.

Accordingly, another object of my invention is to provide a testing arrangement which minimizes the likelihood that one of the breaks other than the one being tested will effect premature circuit interruption.

In accordance with one form of my invention, a circuit interrupter having at least two series-connected simultaneously operable breaks is connected to a source of alternating test voltage by means of an inductive power line interconnecting the source and one terminal of the interrupting device. This power line can be represented by an equivalent circuit in which the inductance of the power line is concentrated and located at a representative point in the power line. The break to be tested is preferably left unshunted, and a first capacitor is connected in series with said test break and in parallel with a second one of said breaks. This first capacitor has a value of capacitance substantially higher than the stray capacitance of that portion of the power line extending between said representative point and said test break. Upon breakdown of the test break in the course of a usual recovery voltage transient, the inductance of the power line coacts with said stray capacitance and said first capacitor to produce high-frequency oscillations having a peak value substantially higher than the value of recovery voltage which caused breakdown of the tested break. This peak value is available across said second break and acts to reignite said second break, thus providing another opportunity for the test break to clear at the next current zero. In addition to the first capacitor, a second capacitor is connected directly across the terminals of the voltage source. This second capacitor is of such a size that its capacitance plus that of the voltage source plus that of the adjacent portion of the power line is substantially larger than the capacitance of the first capacitor. This combined capacitance tends to maintain full voltage at the terminals of the voltage source during the occurrence of the high frequency oscillations. Since it is this terminal voltage which serves as a reference base about which the high frequency oscillations vary, it will be apparent that this combined capacitance acts to insure that the peak value of the oscillations will be substantially above the value of voltage which caused breakdown of the test break.

Figure 2:
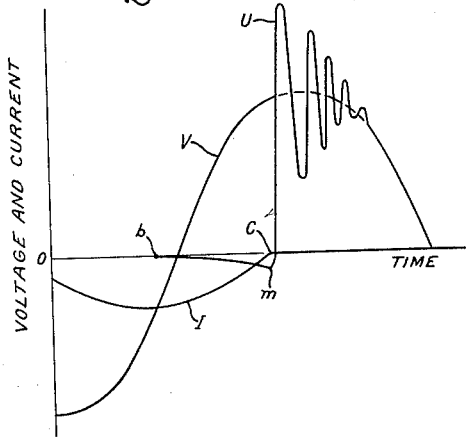
Figure 3:
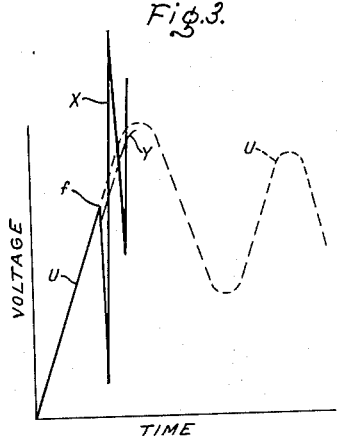
Figure 4:
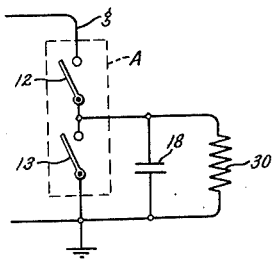
Figure 5:
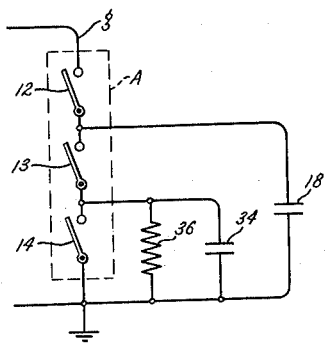

For a better understanding of my invention, reference may be had to the following specification taken in connection with the accompanying drawings, wherein Fig. 1 is a diagrammatic illustration of a test circuit embodying my invention; Figs. 2 and 3 are graphical representations of certain electrical conditions which occur during operation of my test circuit; Fig. 4 is a modification of the test circuit of Fig. 1; whereas Fig. 5 is an additional modification of my test circuit.

Referring now to Fig. 1, I have shown a circuit interrupter A which is to be tested from a source of alternating power, such as a transformer 10. The interrupter, which I have shown schematically, is of a conventional multi-break type comprising two series-connected breaks 12 and 13 which are arranged to be opened substantially simultaneously. An example of this type of interrupter is shown in U. S. Patent No. 2,164,175 issued to E. J. Frank and assigned to the assignee of this invention. For the purposes of this explanation, it will be assumed that the interrupter A, under actual field conditions, will be required to interrupt power which exceeds that which the transformer 10 is capable of supplying. More specifically, it will be assumed that the transformer is capable of delivering a testing current equal to the maximum current which the interrupter, in the field, will be required to interrupt but a testing voltage which is considerably less than the rated voltage of the interrupter.

Power is supplied to the interrupter A by means of an inductive power line 15 interconnecting one terminal $e$ of the transformer 10 and one terminal $g$ of the interrupter. In Fig. 1, this power line 15 is shown as an equivalent circuit in which the inductance of the power line is concentrated in the form of an inductor 17 located at a representative point in the power line. The lower terminals of both the transformer and the interrupter are preferably grounded, as indicated at 16.

If the test is one in which it is desired to evaluate the interrupting ability of the break 12, taking into account the effect of substantially simultaneous arcing in the other break 13, then the break 12 is preferably left unshunted and a capacitor 18 is connected in shunt relationship with the other break 13 and in series relationship with the first break 12, as shown in Fig. 1. In accordance with my invention, this capacitor 18 has a capacitance which is substantially larger than the stray capacitance of that portion of the power line 15 which extends between the terminal g and the point at which the inductance 17 is located. This stray capacitance is represented schematically by a capacitor 20 shown in dotted line form connected between the power line 15 and ground across the terminals of the interrupter A. The capacitor 18 is also of such a value that its capacitance is much larger than the self-capacitance of each of the breaks 12 and 13, say on the order of several hundred times that of break 12.

The capacitance of the transformer itself, plus the stray capacitance of that portion of the power line 15 which extends between the terminal e and the point at which the inductance 17 is located, is represented schematically by a capacitor 23 shown in dotted line form connected directly across the terminals of the transformer. An additional capacitor 22 is connected directly across the output terminals of the transformer 10. This capacitor 22 is of such a size that its capacitance plus that indicated at 23 is substantially higher than that of capacitor 18.

From the above description of the test circuit, it can be seen that the power line 15 is represented by an equivalent circuit of the recognized pi form consisting of a series inductance 17 and a shunt capacitance at each end of the inductance. One of these shunt capacitances 20 has a value representative of the stray capacitance of the power line at the interrupter end of the power line, and the other of the shunt capacitances has a value representative of the stray capacitance of the power line at the source end thereof. This shunt capacitance at the source end of the power line is included as a portion of the capacitance 23 of Fig. 1.

The above-described test circuit operates in the following manner. The transformer 10 is first energized by closing a suitable switch 24 shown located in the transformer primary circuit, and shortly thereafter the breaker containing the interrupter A is tripped to initiate opening movement of its movable contacts. If desired, the switch 24 can be located in the power line 15 instead of in the location shown. When the contacts forming the breaks 12 and 13 of interrupter A are initially separated, a pair of series-related arcs will be concurrently established at the two breaks. Current will continue to flow through each of these arcs until a first current zero occurs. Ordinarily, at this instant, the arc vanishes and a voltage, commonly known as the transient recovery voltage rapidly builds up across the open break 12. If, in the meantime, the dielectric strength of the break 12 has built up sufficiently rapidly and to a sufficiently high value, this recovery voltage would rise to substantially the full recovery voltage available from the source. This is the case because the capacitance of 18 is so high relative to the self-capacitance of break 12 that when the recovery voltage is distributed across the breaks 12 and 13, only a negligible amount appears across the break 13. Thus, substantially the entire recovery voltage is available across break 12.

Assuming that no breakdown occurred, the voltage across the break 12 would have a wave form illustrated by the curve U in Fig. 2. As indicated by this curve U, as soon as the contacts are separated at a point designated b, voltage across the break 12 appears and soon rises to a value of maximum arc voltage m at the current zero indicated at point C on the current wave form I. At that instant, the usual high frequency recovery voltage transient begins. After passing through zero on the curve U, this transient voltage increases to its peak value and thereafter oscillates about the normal system voltage indicated by the wave form V.

If, in the meantime, the dielectric strength of the gap had built up sufficiently rapidly and to a sufficiently high value to withstand the recovery voltage transient, then the break 12 would have successfully interrupted the circuit and no further breakdowns would have occurred. However, if break 12 should fail to withstand the recovery voltage transient, as might be the case for the first one or two current zeros, then the remaining break 13 would be subjected to a second recovery voltage (soon to be described) which would cause its breakdown. As a result, current would continue for another half cycle and, accordingly, break 12 would have another opportunity to interrupt the circuit.

In order that the tested break (12) be subjected to voltage and current for a duration as great as would be encountered under actual field conditions, it is important that the other break (13) not effect premature interruption of the circuit. To this end, my test circuit minimizes the possibility of such premature interruption by introducing into the above-described recovery voltage transient an added voltage component which subjects the remaining break 13 to a still higher voltage than that which caused the tested break 12 to collapse.

This added voltage component is obtained, upon collapse of break 12, by the coaction of inductance 17 with capacitances 18 and 20 to produce oscillations having an available peak value substantially higher than that of the recovery voltage transient U of Fig. 2. The wave form of this added voltage component is shown in Fig. 3, where I have shown the transient recovery voltage U of Fig. 2 in an enlarged and expanded form.

If it is assumed that the transient recovery voltage U has caused gap 12 to break down at a point f (shown in Fig. 3), then the voltage at the upper terminal g of the interrupter will quickly drop to a fraction of its former value, f. Then by oscillations of the capacitances 18 and 20 with the line inductance 17, the voltage at terminal g will rise to a value approaching twice that existing at the terminal g before collapse of break 12. These oscillations, which have a much higher frequency than the dominant frequency of the normal recovery voltage transient, are illustrated by the curve X of Fig. 3. During these high frequency oscillations, X, voltage at the terminal of the transformer 10 is maintained by means of the capacitor 22 acting together with the self-capacitance 23 of the transformer and the adjacent line portion. More particularly upon breakdown of the break 12, this capacitor 22 begins to discharge, but since its capacity is high relative to that of capacitor 18, it permits only a slight initial drop in the transformer terminal voltage and thereafter causes the terminal voltage to follow a path Y only slightly below that of the normal recovery voltage transient. Since it is this terminal voltage Y which serves as a reference base about which the oscillations X vary and since the capacitor 22 maintains this reference base voltage at instantaneous values only slightly below those of the normal recovery voltage U, it will be apparent that the oscillations X can reach peak values which are appreciably higher than those of the normal recovery voltage transient. Accordingly, a substantially higher voltage is available across the second break 13 than is available across the tested break 12 and, as a result, the break 13 nearly always breaks down following breakdown of the tested break 12. Thus, the possibility that break 13 will effect premature circuit interruption is minimized, and the tested break 12 is subjected to representative voltages and currents for a time duration representative of actual field conditions.

In accordance with my invention, the combined capacitance of capacitors 22 and 23 must be large compared to that of capacitor 18 in order that the reference voltage base Y for the oscillations X be maintained at the desired high level. Also in accordance with my invention, the capacitance of 18 should be large relative to the stray capacitance 20 in order that the oscillations X have a sufficiently high amplitude to assure breakdown of gap 13. The higher is the capacitance of 18, the lower is the frequency of the oscillations X and, thus, the more time the first loop of these oscillations will have to precipitate breakdown of the gap 13. The factor which limits the maximum value of capacitance which should be provided for 18 is that this capacitance should be substantially less than the combined capacitances 22 and 23, this combined capacitance in turn being limited by its effect on the rate of recovery for the recovery voltage transient U of Fig. 2.

Assuming that each of the two breaks of the tested interrupter has a self-capacitance of about 100 micromicrofarads, the other circuit parameters, by way of example, can have the following values; capacitor 18—0.02 microfarad; capacitor 22—0.06 microfarad; capacitance 20—0.0005 microfarad; capacitance 23—0.002 microfarad; inductance 17—100 microhenries.

In some applications of my testing circuit, I have found that post-arc conductivity has resulted in reduced recovery voltage being available across the break being tested. For example, as a result of such post-arc conductivity, say in the break 12 of Fig. 1, it is possible for a charge to accumulate on the capacitor 18 and thus reduce the amount of recovery voltage available across the break 12. In accordance with the modified form of my invention shown in Fig. 4, I insure against such a charge-accumulation by connecting a leakage resistor 30 across the terminals of the capacitor 18. This resistor provides a discharge path for any current which might flow through break 12 as a result of post-arc conductivity, thereby preventing such current from charging the capacitor. A typical value for this resistor, assuming that the other components are the same as in Fig. 1, would be approximately 6000 ohms, by way of example.

My invention is also applicable to multi-break interrupters having more than two breaks. For example, in Fig. 5, I have shown the invention applied to an interrupter having three substantially simultaneously-operable breaks 12, 13 and 14. Assuming once again that it is desired to evaluate the interrupting ability of the top break 12, taking into account the effect of substantially simultaneous arcing at the other breaks, I connect a capacitor 18 in series with the top break and in parallel with the other two breaks 13 and 14. I also connect another capacitor 34 in parallel with the lower break 14 and in series with the other two breaks 12 and 13. To promote breakdown of the lower break as soon as possible after breakdown of the middle break 12, this capacitor 34 should have a minimum of capacitance consistent with the requirements of any equipment (not shown) which might be used for measuring voltage across the lower break 14. Assuming, for example, that all of the other circuit parameters have about the same values as described above, I have found that a capacitance of 0.0005 microfarad for capacitor 34 will produce satisfactory results. A leakage resistor 36 is connected across the terminals of the capacitor 34 to insure against the accumulation of charge on the capacitor 34 as a result of any current flow made possible by post-arc conductivity in the break 13, as was explained in connection with Fig. 2. By way of example, a satisfactory ohmic value for this resistor is about 6000 ohms. Draining off this post-arc current is particularly important where the shunting capacitor is small, as is the case with capacitor 34, because, without such drainage, only a relatively small current would produce an appreciable charge on the capacitor. Since there is essentially no charge present on the capacitor 34 at the time the above-described voltage X (Fig. 3) is applied to the break 13, substantially this entire voltage X will be available to reignite this break 13, as is desired. When break 13 reignites, substantially the entire recovery voltage is available to produce reignition of the remaining lower break 14. When this lower break does reignite, the upper or tested break will be provided with another opportunity to clear at the next current zero.

While I have shown and described particular embodiments of my invention, it will be obvious to those skilled in the art that various changes and modifications may be made without departing from my invention in its broader aspects and I, therefore, intend in the appended claims to cover all such changes and modifications as fall within the true spirit and scope of my invention.

What I claim as new and desire to secure by Letters Patent of the United States is:

1. In a circuit which utilizes a source of alternating test voltage for testing a multi-break interrupting device having at least two series-connected breaks which are concurrently-openable to initiate at a current zero a recovery voltage transient across a first one of said breaks, means responsive to breakdown of said first break in the course of said recovery voltage transient for producing in said recovery voltage transient oscillations having a frequency appreciably higher than the dominant frequency of said recovery voltage transient and having an available peak value of approximately double the voltage which produced breakdown of said first break, and means for applying to said second break substantially the entire recovery voltage including the component produced by said high frequency oscillations, whereby to promote breakdown of said second break and thus provide said first break with another opportunity to interrupt at the next current zero.

2. In a circuit which utilizes a source of alternating test voltage for testing a multi-break interrupting device having at least two series-connected breaks which are concurrently-openable to initiate at a current zero a recovery voltage transient across a first one of said breaks, means responsive to breakdown of said first break in the course of said recovery voltage transient for producing in said recovery voltage transient oscillations having a frequency appreciably higher than the dominant frequency of said recovery voltage transient and having an available peak value substantially higher than the voltage which produced breakdown of said first break, and means for applying to said second break substantially the entire recovery voltage including the component produced by said high frequency oscillations, whereby to promote breakdown of said second break and thus provide said first break with another opportunity to interrupt at the next current zero.

3. In a circuit for testing a circuit interrupting device which has at least two series-connected concurrently-operable breaks, a source of alternating test voltage, an inductive power line interconnecting said source and one terminal of the interrupting device and having an equivalent circuit in which the inductance of said power line is concentrated and located at a representative point therein, a first capacitor connected in series with a first one of said breaks and in parallel with a second one of said breaks, the capacitance of said first capacitor being substantially higher than the stray capacitance of that portion of said power line which extends between said representative point in said power line and said first break, and a second capacitor connected across the terminals of said voltage source, the capacitance of said second capacitor plus the capacitance of said voltage source plus the capacitance of that portion of the power line extending between said source and said representative point being substantially higher than the capacitance of said first capacitor.

4. In a circuit for testing a circuit interrupting device which has at least two series-connected concurrently-operable breaks, a source of alternating test voltage, an inductive power line interconnecting said source and one terminal of the interrupting device and having an equivalent circuit comprising a series inductance and a shunt capacitance at each end of said inductance, a first capacitor connected in series with a first one of said breaks and in parallel with a second one of said breaks, the capacitance of said first capacitor being substantially higher than the equivalent shunt capacitance at the breaker end of said power line, and a second capacitor connected across the terminals of said voltage source, the capacitance of said second capacitor plus the capacitance of said voltage source plus the equivalent shunt capacitance at the source end of said power line being substantially higher than the capacitance of said first capacitor.

5. In a circuit for testing a circuit interrupting device which has at least two series-connected concurrently-operable breaks, a source of alternating test voltage, an inductive power line interconnecting said source and one terminal of the interrupting device and having an equivalent circuit comprising a series inductance and a shunt capacitance at each end of said inductance, first capacitance means disposed in series with a first one of said breaks and paralleling a second one of said breaks, the capacitance of said first capacitance means being substantially higher than the equivalent shunt capacitance at the breaker end of said power line, second capacitance means including the equivalent shunt capacitance at the source end of said power line disposed across the terminals of said voltage source and having a capacitance which is substantially higher than that of said first capacitance means.

6. In a circuit for testing a circuit interrupting device which has at least two series-connected concurrently-operable breaks, a source of alternating test voltage, an inductive power line interconnecting said source and one terminal of the interrupting device and having an equivalent circuit comprising a series inductance and a shunt capacitance located at each end of said inductance, first capacitance means disposed in series with a first one of said breaks and paralleling a second one of said breaks, the capacitance of said first capacitor means being substantially higher than the equivalent shunt capacitance at the breaker end of said power line, second capacitance means including the equivalent shunt capacitance at the source end of said power line disposed across the terminals of said voltage source and having a capacitance which is substantially higher than that of said first capacitance means, and means comprising a leakage resistor connected in parallel with said first capacitance means and in series with said first break for insuring against the accumulation of a charge on said first capacitance means as a result of post-arc conductivity.

7. In a circuit for testing a circuit interrupting device which has at least three series-connected concurrently-operable breaks, a source of alternating test voltage, an inductive power line interconnecting said source and one terminal of the interrupting device and having an equivalent circuit comprising a series inductance and a shunt capacitance at each end of said inductance, first capacitance means disposed in series with a first one of said breaks and paralleling a second and third one of said breaks, the capacitance of said first capacitance means being substantially higher than the equivalent capacitance at the breaker end of said power line, second capacitance means including the equivalent shunt capacitance at the source end of said power line disposed across the terminals of said voltage source and having a capacitance which is substantially higher than the capacitance of said first capacitance means, and third capacitance means disposed in series with said first and second breaks and paralleling said third break.

8. The circuit of claim 7 in combination with means comprising a leakage resistor connected in parallel with said third capacitance means and in series with said first and second breaks for insuring against the accumulation of a charge on said third capacitance means as a result of post-arc conductivity.

References Cited in the file of this patent

FOREIGN PATENTS

| | | |
|---|---|---|
| 983,535 | France | June 25, 1951 |
| 662,549 | Great Britain | Dec. 5, 1951 |